US011181884B2

United States Patent
Tian et al.

(10) Patent No.: US 11,181,884 B2
(45) Date of Patent: Nov. 23, 2021

(54) METHOD FOR SYNCHRONIZED MULTI-AXIS MOTION CONTROL OF FLEXIBLE ELECTRONIC GEARBOX

(71) Applicant: Hefei University of Technology, Anhui (CN)

(72) Inventors: Xiaoqing Tian, Anhui (CN); Dan Li, Anhui (CN); Yu Wu, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 16/854,195

(22) Filed: Apr. 21, 2020

(65) Prior Publication Data

US 2021/0325845 A1 Oct. 21, 2021

(51) Int. Cl.
| | |
|---|---|
| G05B 19/402 | (2006.01) |
| G05B 19/404 | (2006.01) |
| G06N 7/00 | (2006.01) |
| G06F 17/18 | (2006.01) |
| G05B 19/416 | (2006.01) |

(52) U.S. Cl.
CPC ......... *G05B 19/402* (2013.01); *G05B 19/404* (2013.01); *G05B 19/416* (2013.01); *G06F 17/18* (2013.01); *G06N 7/00* (2013.01); *G05B 2219/41359* (2013.01)

(58) Field of Classification Search
None
See application file for complete search history.

(56) References Cited

U.S. PATENT DOCUMENTS

| | | | | |
|---|---|---|---|---|
| 5,209,333 | A | * 5/1993 | Molitor | B23F 5/16 |
| | | | | 192/108 |
| 2014/0271010 | A1* | 9/2014 | Napau | B23F 9/105 |
| | | | | 409/12 |
| 2018/0221976 | A1* | 8/2018 | Yoshinaga | B23F 21/10 |

FOREIGN PATENT DOCUMENTS

CN 110788414 A * 2/2020

OTHER PUBLICATIONS

Machine Translation of Description for CN110788414-A (Feb. 2020) (Year: 2020).*
Machine Translation of Claims for CN110788414-A (Feb. 2020) (Year: 2020).*

* cited by examiner

*Primary Examiner* — Ryan A Jarrett
(74) *Attorney, Agent, or Firm* — Boyle Fredrickson, S.C.

(57) ABSTRACT

According to a machining principle of the CNC gear hobbing machine, a functional relation between a geometric error of a gear and a tracking error of each motion axis of the machine tool is constructed; a machining error mathematical model of tooth profile deviation, tooth pitch deviation and tooth direction deviation at each position control time point is established by tracking errors of each motion axis; a compensation quantity required for a workpiece rotation axis at the next position control time point is calculated by establishing a decoupling compensation model; average absolute values of machining errors and a total compensation quantity of the machining errors under the conditions of not adopting the synchronous control method and adopting the synchronous control method in the total position control time are obtained by calculating machining error values of each position controls time point, and the synchronized multi-axis motion control is completed.

2 Claims, 2 Drawing Sheets

METHOD FOR SYNCHRONIZED MULTI-AXIS MOTION CONTROL OF FLEXIBLE ELECTRONIC GEARBOX

FIELD OF THE INVENTION

The present invention belongs to the technical field of CNC machines, and particularly relates to a method for synchronized multi-axis motion control of CNC machines coupled together.

BACKGROUND OF THE INVENTION

In order to realize multi-axis motion control for general CNC machines, two DC motors are generally driven by a set of DC speed regulating device, armatures of the two motors are connected in series, and excitation coils are connected in parallel. In order to keep the speed synchronous, two motor shafts must be rigidly connected, and only one of the two motors provides speed feedback data. At the same time, two AC frequency conversion speed control systems control two AC frequency conversion or servo motors as primary and secondary shafts, respectively, and the two motors each provide their own speed feedback data. In order to keep the speed synchronous, the two motor shafts must also be rigidly connected. However, due to a gap, a speed ring is continuously adjusted, making the control system extremely unstable. Usually, oscillation caused by static error adjustment by the control system can be obviously observed at the motor shaft end. If installed at the motor end, the system can be stable, but it is difficult to ensure the control accuracy due to the transmission gap. In addition, the CNC machine has extremely strict requirements for two or more relative motion speeds associated with inner-linked transmission during machining. A conventional CNC system uses an interpolation algorithm to obtain linkage motion instructions of multiple coordinates, but the dynamic accuracy and static accuracy of each coordinate axis cannot be consistent, so it cannot meet the requirements of inner-linked transmission.

As China still has no patented CNC system for machining medium and high grade gears, we have to purchase CNC systems from other countries, such as SIEMENS of Germany, FANUC of Japan, Mitsubishi of Japan and NUM of France. This patent is proposed in order to fill the gap in the field of multi-axis linkage high-precision control based on a flexible electronic gear box.

In addition, with the same machining quality, China-developed CNC system for machining medium and high grade gears with an electronic gearbox function is priced less than 50% that of an imported one, thus having greater performance and price advantages.

SUMMARY OF THE INVENTION

In order to realize multi-axis linkage high-precision control based on a flexible electronic gearbox in the hobbing process, the present invention provides a method for synchronized multi-axis motion control of a flexible electronic gearbox.

A method for synchronized multi-axis motion control of a flexible electronic gearbox is provided. The method is suitable for a CNC gear bobbing machine. The gear hobbing machine includes an A axis, a B axis, a C axis, an X axis, a Y axis and a Z axis, the A axis serves as a reference for adjusting a hob installation angle, the B axis serves as a reference for hob rotation, the C axis serves as a reference for workpiece rotation, the X axis serves as a reference for hob radial feeding, the Y axis serves as a reference for hob tangential feeding, the Z axis serves as a reference for hob axial feeding, where the B axis, the X axis, the Y axis and the Z axis are main motion axes; a servo motor of each main motion axis is detected by a grating encoder and detection results are then input into a microprocessor as reference data, detections results of the B axis, Y axis and Z axis (excluding the X axis) obtained after a functional module of the flexible electronic gearbox performs calculation and transformation according to a mathematical model of a gear hobbing machining technology serve as working data of the C axis, a motion law specified by an electronic gearbox module is realized by using a control theory algorithm to realize gear bobbing machining; the flexible electronic gearbox realizes control functions based on an ARM-DSP-FPGA based hardware platform.

According to a machining principle of the CNC gear bobbing machine, a functional relation between a geometric error of a gear and a tracking error of each motion axis of the machine tool is constructed; the tracking errors include: a B axis tracking error $E_b$ (a hob rotation axis tracking error $E_b$), a C axis tracking error $E_c$ (a workpiece rotation axis tracking error $E_c$), a Z axis tracking error $E_z$ (a hob axial feed axis tracking error $E_z$), Y axis tracking error $E_y$ (a hob tangential feed axis tracking error $E_y$), an X axis tracking error $E_x$ (a hob radial feed axis tracking error $E_x$) and a hob installation angle error $E_a$; a machining error mathematical model of tooth profile deviation $F_\alpha$, tooth pitch deviation $F_P$ and spiral deviation $F_\beta$ is established by tracking errors of each motion axis, and the geometric error of the gear is evaluated by using numerical results of the machining error mathematical model; through each motion axis error of each position control time point, machining error values of this time point, namely the value of the tooth profile deviation $F_\alpha$, the value of the tooth pitch deviation $F_P$ and the value of the spiral deviation $F_\beta$, are calculated; based on a principle of cross-coupling control, a decoupling compensation model is established to calculate a compensation quantity $\Delta E_c$ required for the C axis; the compensation quantity $\Delta E_c$ is compensated to the C axis at the next position control time point, and the compensated machining error values, namely the compensated value of the tooth profile deviation $F_\alpha$, the compensated value of the tooth pitch deviation $F_P$ and the compensated value of the spiral deviation $F_\beta$, are calculated through tracking errors of each motion axis at the time point; meanwhile, the synchronized multi-axis motion control of the total position control time is completed by obtaining average absolute values of the machining errors and the total compensation quantity of the machining errors under the conditions of not adopting the synchronous control method and adopting the synchronous control method in the total position control time.

The technical solution of the present invention can be further defined as follows:

The method for synchronized multi-axis motion control based on a flexible electronic gearbox includes the following operating steps:

(1): determining the gear machining type by "a diagonal hobbing method"

where when the "diagonal hobbing method" is used to machine a helical cylindrical gear, since a hob cutter moves along the Z axis, the C axis generates additional rotation to meet a geometrical relationship of a generated spiral; when there is a need for a hob shifting process, since the hob cutter moves along the Y axis, the C axis generates additional rotation to meet a generating relationship changing due to hob shifting:

the generating and differential relationship for machining the helical cylindrical gear is shown in formula (1), $$n_c = K_b \frac{Z_b}{Z_c} n_b + K_z \frac{\sin\beta}{\pi m_n Z_c} v_z + K_y \frac{\cos\lambda}{\pi m_n Z_c} v_y \tag{1}$$

in the formula, $Z_b$, $\lambda$ and $n_b$ are the number of threads of a hob cutter, a hob spiral angle and a hob shaft speed respectively, $Z_c$, $\beta$, $m_n$ and $n_c$ are the number of workpiece teeth, a spiral angle of a workpiece, a normal module of the workpiece and a rotating speed of the workpiece respectively; $K_b$, $K_z$ and $K_y$ are a first item coefficient, a second item coefficient and a third item coefficient respectively; $v_z$ is a hob axial feed speed, and $v_y$ is a hob tangential feed speed; when the hob spiral angle is right-handed, namely when $\beta > 0$, $K_b = 1$; when the hob spiral angle is left-handed, namely when $\beta < 0$, $K_\beta = -1$; when $\beta > 0$ and $V_Z < 0$, $K_Z = 1$; when $\beta < 0$ and $V_Z < 0$, $K_Z = -1$; when $\beta > 0$ and $V_Z > 0$, $K_Z = -1$; when $\beta < 0$ and $V_Z > 0$, $K_Z = 1$; when $V_Y > 0$, $K_Y = 1$; when $V_Y < 0$, $K_Y = -1$;

when a straight tooth cylindrical gear is machined, the spiral angle of the workpiece $\beta = 0$;

(2): establishing a machining error mathematical model where the machining types of the CNC gear hobbing machine determined by step (1) are a left-handed helical cylindrical gear, a right-handed helical cylindrical gear and the straight tooth cylindrical gear; a machining error mathematical model of a workpiece at a position control time point $t_k$ is established, relevant parameters involved in the motion errors include: a B axis tracking error $E_b$, a C axis tracking error $E_c$, a Z axis tracking error $E_z$, a Y axis tracking error $E_y$, an X axis tracking error $E_x$ and a hob installation angle error $E_a$; tracking errors of each motion axis at the position control time point $t_k$ are recorded as $E_b^k$, $E_c^k$, $E_z^k$, $E_y^k$, $E_x^k$ and $E_a^k$, where units of $E_z^k$, $E_y^k$ and $E_x^k$ are mm, units of $E_b^k$ and $E_c^k$ are rad, and the unit of $E_z^k$ is degree, k is 0-n;

three evaluation indexes of the geometric error of the gear, namely tooth profile deviation $F_\alpha^k$, tooth pitch deviation $F_P^k$ and tooth direction deviation $F_\beta^k$, are established according to a relative position and attitude relationship between the hob and the workpiece during hobbing, and the machining error mathematical model of the position control time point $t_k$ is as follows:

$$F_\alpha^k = \frac{\pi m_n Z_c \cos\alpha}{360° \cos\beta} E_c^k + \sin\alpha E_x^k + \cos\gamma\cos E_a^k \cos\alpha E_y^k \tag{2}$$

$$F_P^k = \frac{\pi m_n Z_c}{360° \cos\beta} E_c^k + \tan\alpha E_x^k + \cos\gamma\cos E_a^k E_y^k \tag{3}$$

$$F_\beta^k = \frac{\pi m_n Z_c}{360° \cos\beta} E_c^k + \cos\gamma\cos E_a^k E_y^k + \tan\beta E_z^k \tag{4}$$

in formulas (2), (3) and (4), units of $F_\alpha^k$, $F_P^k$ and $F_\beta^k$ are mm, $m_n$ is a normal module of the workpiece, $Z_c$ is the number of workpiece teeth, $\alpha$ is a workpiece pressure with a unit of degree, $\beta$ is a spiral angle of the workpiece with a unit of degree, $\gamma$ is a hob installation angle with a unit of degree; when the hob is right-handed, $\beta$ is greater than 0; when the hob is left-handed, $\beta$ is less than 0;

(3): establishing a decoupling compensation model according to the machining error mathematical model, a decoupling compensation model based on the principle of cross-coupling control is proposed to reduce the synchronized multi-axis motion error so as to realize accurate control of synchronized multi-axis motion; an item $E_c^k$ in formula (3) is set to $E_c^k - \Delta E_c^{k+1}$ to obtain formula (5), and a tooth pitch error $F_P^k$ is set to 0;

$$F_P^k = \frac{\pi m_n Z_c}{360° \cos\beta}(E_c^k - \Delta E_c^{k+1}) + \tan\alpha E_x^k + \cos\gamma\cos E_a^k E_y^k = 0 \tag{5}$$

according to formula (5), a relationship between a compensation object and multiple parameters affecting the geometric error of the gear is obtained, namely a relationship between the C axis compensation quantity $\Delta E_c^{k+1}$ at the position control time point $t_{k+1}$ and the tracking error $E_c$, $E_x$ and $E_y$ of each motion axis at the position control time point $t_k$, is obtained, and the decoupling compensation model is obtained as follows:

$$\Delta E_c^{k+1} = E_c^k + \frac{360° \tan\alpha\cos\beta}{\pi m_n Z_c} E_x^k + \frac{360° \cos\gamma\cos E_a^k \cos\beta}{\pi m_n Z_c} E_y^k \tag{6}$$

in formula (6): $\Delta E_c^{k+1}$ is a C axis compensation quantity with a unit of mm, $m_n$ is gear normal module, $Z_c$ is the number of gear teeth, $\alpha$ is a gear pressure angle with a unit of degree, $\beta$ is a spiral angle of a gear with a unit of degree, and $\gamma$ is a hob installation angle with a unit of degree;

$$E_c^{(k+1)'} = E_c^{k+1} - \Delta E_c^{k+1} \tag{7}$$

in formula (7): $E_c^{(k+1)'}$ is the C axis tracking error when synchronous motion control is adopted at the position control time point $t_{k+1}$, and the unit is rad;

in formulas (5), (6) and (7), k is 0-n;

(4): calculating the average absolute value of the machining errors and the total compensation quantity of the machining errors under the condition of not adopting the synchronous control method, average absolute values of three items of the machining errors of the total position control time t are respectively as follows:

$$M_\alpha = \frac{1}{n}\sum_{k=1}^{n}|F_\alpha^k|; \quad M_P = \frac{1}{n}\sum_{k=1}^{n}|F_P^k|; \quad M_\beta = \frac{1}{n}\sum_{k=1}^{n}|F_\beta^k|$$

$M_\alpha$ is an average absolute value of tooth profile errors with a unit of mm, $M_P$ is an average absolute value of tooth pitch errors with a unit of mm, $M_\beta$ is an average absolute value of tooth shape errors with a unit of mm, and k is 0-n;

under the condition of adopting the synchronous control method, $E_b^k$, $E_c^{k'}$, $E_z^k$, $E_y^k$, $E_x^k$ and $E_a^k$ are taken into formulas (2), (3) and (4) to obtain $F_\alpha^{k'}$, $F_P^{k'}$ and $F_\beta^{k'}$ of the position control time point $t_k$, and average absolute values of three items of the machining errors of the total position control time t are respectively as follows:

$$M'_\alpha = \frac{1}{n}\sum_{k=1}^{n}|F_\alpha^{k'}|; \ M'_P = \frac{1}{n}\sum_{k=1}^{n}|F_P^{k'}|; \ M'_\beta = \frac{1}{n}\sum_{k=1}^{n}|F_\beta^{k'}|$$

$M_\alpha'$ is an average absolute value of tooth profile errors with a unit of mm, $M_P'$ is an average absolute value of tooth pitch errors with a unit of mm, $M_\beta'$ is an average absolute value of tooth shape errors with a unit of mm, and k is 0-n;

the total compensation quantity for the total position control time t is:

$$S = n(M_\alpha + M_P + M_\beta - M_\alpha' - M_P' - M_\beta') \quad (8)$$

in formula (8), S is the total compensation quantity for the total position control time t with a unit of mm, and the synchronized multi-axis motion control of the total position control time t is completed.

The present invention has the following beneficial technical effects:

(1) The method for synchronized multi-axis motion control of a flexible electronic gearbox in the present invention can compensate for and correct machining errors of a gear in the process of machining the gear by using a CNC gear hobbing machine, thereby reducing the geometric error of the gear.

(2) The method for synchronized multi-axis motion control of a flexible electronic gearbox in the present invention can increase the machining speed by 20-30% and shorten the debugging time of the machine tool by 10%/6-30% thereby reducing the production cost.

(3) The method for synchronized multi-axis motion control of a flexible electronic gearbox in the present invention can flexibly machine different types of gears, such as a left-handed helical cylindrical gear, a right-handed helical cylindrical gear and a straight tooth cylindrical gear, by using a CNC gear hobbing machine, and it is not required to provide a method for synchronized multi-axis motion control for a workpiece gear. Therefore, the method of the present invention has wide adaptability.

DETAILED DESCRIPTION OF THE DRAWINGS

In order to more specifically describe the implementation technical means and innovative features of the present invention, the technical solution of the present invention is described in further detail below through examples with reference to the accompanying drawings.

A method for synchronized multi-axis motion control of a flexible electronic gearbox is suitable for a CNC gear bobbing machine. The gear bobbing machine includes an A axis, a B axis, a C axis, an X axis, a Y axis and a Z axis, the A axis serves as a reference for adjusting a hob installation angle, the B axis serves as a reference for hob rotation, the C axis serves as a reference for workpiece rotation, the X axis serves as a reference for hob radial feeding, the Y axis serves as a reference for hob tangential feeding, the Z axis serves as a reference for hob axial feeding.

Example 1

Hob parameters are as follows: with respect to a right-handed hob, a normal module $m_n$ is 1, the number $Z_b$ of hob heads is 1, a hob pressure angle $\alpha$ is 20°, a hob spiral angle $\lambda$ is 1.93°, an installation angle $\gamma$ is 23.07°, hob axial feed $V_Z$ is less than 0, and hob tangential feed $V_Y$ is greater than 0. Workpiece parameters are as follows: a gear normal module $m_n$ is 1, the number $Z_c$ of gear teeth is 49, a gear pressure angle $\alpha$ is 20°, the gear is right-handed, a spiral angle $\beta$ is 25°, and the total position control time is 11 ms and is divided into 11 position control time points.

The method for synchronized multi-axis motion control based on a flexible electronic gearbox includes the following operating steps:

(1): Determine the Gear Machining Type by "a Diagonal Hobbing Method".

When the "diagonal bobbing method" is used to machine a helical cylindrical gear, since a hob cutter moves along the Z axis, the C axis generates additional rotation to meet a geometrical relationship of a generated spiral; when there is a need for a hob shifting process, since the hob cutter moves along the Y axis, the C axis generates additional rotation to meet a generating relationship changing due to hob shifting;

the generating and differential relationship for machining the helical cylindrical gear is shown in formula (1), $$n_c = 0.0204 \times n_b + 0.0027 \times v_z + 0.0064 \times v_y \quad (1)$$

In the formula, $n_b$ is a hob shaft speed, $n_c$ is a rotating speed of a workpiece, $v_z$ is a hob axial feed speed, and $v_y$ is a hob tangential feed speed.

(2): Establish a Machining Error Mathematical Model.

After the machining types of the CNC gear hobbing machine determined by step (1) are a right-handed helical cylindrical gear, a machining error mathematical model of a workpiece at a position control time point $t_k$ is established, relevant parameters involved in the motion errors include: a B axis tracking error $E_b$, a C axis tracking error $E_c$, a Z axis tracking error $E_z$, a Y axis tracking error $E_y$, an X axis tracking error $E_x$ and a hob installation angle error $E_a$; tracking errors of each motion axis at the position control time point $t_k$ are recorded as $E_b^k$, $E_c^k$, $E_z^k$, $E_y^k$, $E_x^k$ and $E_a^k$, where units of $E_z^k$, $E_y^k$ and $E_x^k$ are mm, units of $E_b^k$ and $E_c^k$ are rad, and the unit of $E_a^k$ is degree, k is 0-10; and tracking error data of each motion axis for the position control time points $t_0$ to $t_{10}$ is shown in Table 1.

TABLE 1

|  | $E_a^k$ | $E_c^k$ | $E_z^k$ | $E_y^k$ | $E_x^k$ |
| --- | --- | --- | --- | --- | --- |
| $t_0$ | 0 | 0.0031 | 0.00012 | −0.00032 | −0.0008 |
| $t_1$ | 0 | 0.0052 | 0.00016 | −0.00024 | −0.00068 |
| $t_2$ | 0.0003 | −0.0011 | 0.00008 | −0.00017 | −0.00021 |
| $t_3$ | 0.0001 | −0.0023 | 0.00013 | 0.00003 | −0.00019 |
| $t_4$ | 0.0003 | 0.0033 | 0.00011 | 0.00012 | −0.00054 |
| $t_5$ | −0.0001 | 0.0025 | 0.00013 | −0.00021 | 0.00001 |
| $t_6$ | −0.0001 | 0.0024 | 0.0001 | −0.00025 | −0.00015 |
| $t_7$ | 0.0001 | 0.0039 | 0.00006 | −0.0003 | −0.00041 |
| $t_8$ | −0.0002 | 0.0034 | 0.00012 | 0.00011 | −0.00027 |
| $t_9$ | 0 | −0.0014 | 0.00003 | −0.00041 | −0.00011 |
| $t_{10}$ | 0.0001 | −0.0051 | 0.00014 | −0.00034 | −0.00051 |

Three evaluation indexes of the geometric error of the gear, namely tooth profile deviation $F_\alpha^k$, tooth pitch deviation $F_P^k$ and tooth direction deviation $F_\beta^k$, are established according to a relative position and attitude relationship between the hob and the workpiece during hobbing, and the machining error mathematical model of the position control time point $t_k$ is as follows:

$$F_\alpha^k = 0.4434 \times E_c^k + 0.3420 \times E_x^k + 0.8645 \times \cos E_a^k E_y^k \quad (2)$$

$$F_P^k = 0.4718 \times E_c^k + 0.3640 \times E_x^k + 0.9200 \cos E_a^k E_y^k \quad (3)$$

$$F_\beta^k = 0.4718 \times E_c^k + 0.9200 \times \cos E_a^k E_y^k + 0.4663 \times E_z^k \quad (4)$$

In formulas (2), (3) and (4), units of $F_\alpha^k$, $F_P^k$ and $F_\beta^k$ are mm, units of $E_z^k$, $E_y^k$ and $E_x^k$ are mm, units of $E_b^k$ and $E_c^k$ are rad, and the unit of $E_d^k$ is degree.

(3): Establish a Decoupling Compensation Model.

Figure 1:
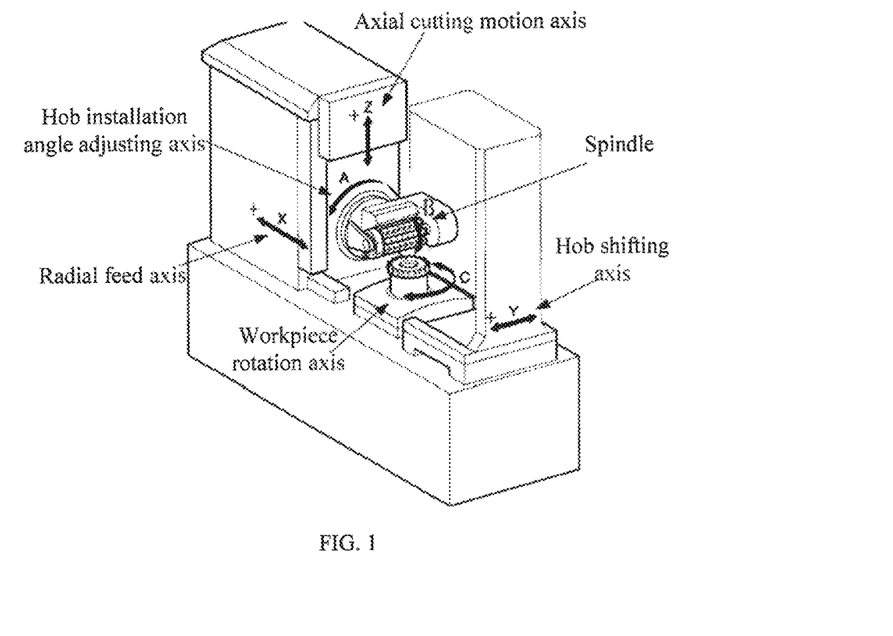
FIG. 1 is a schematic diagram of distribution of each motion axis of a gear hobbing machine tool.
Figure 2:
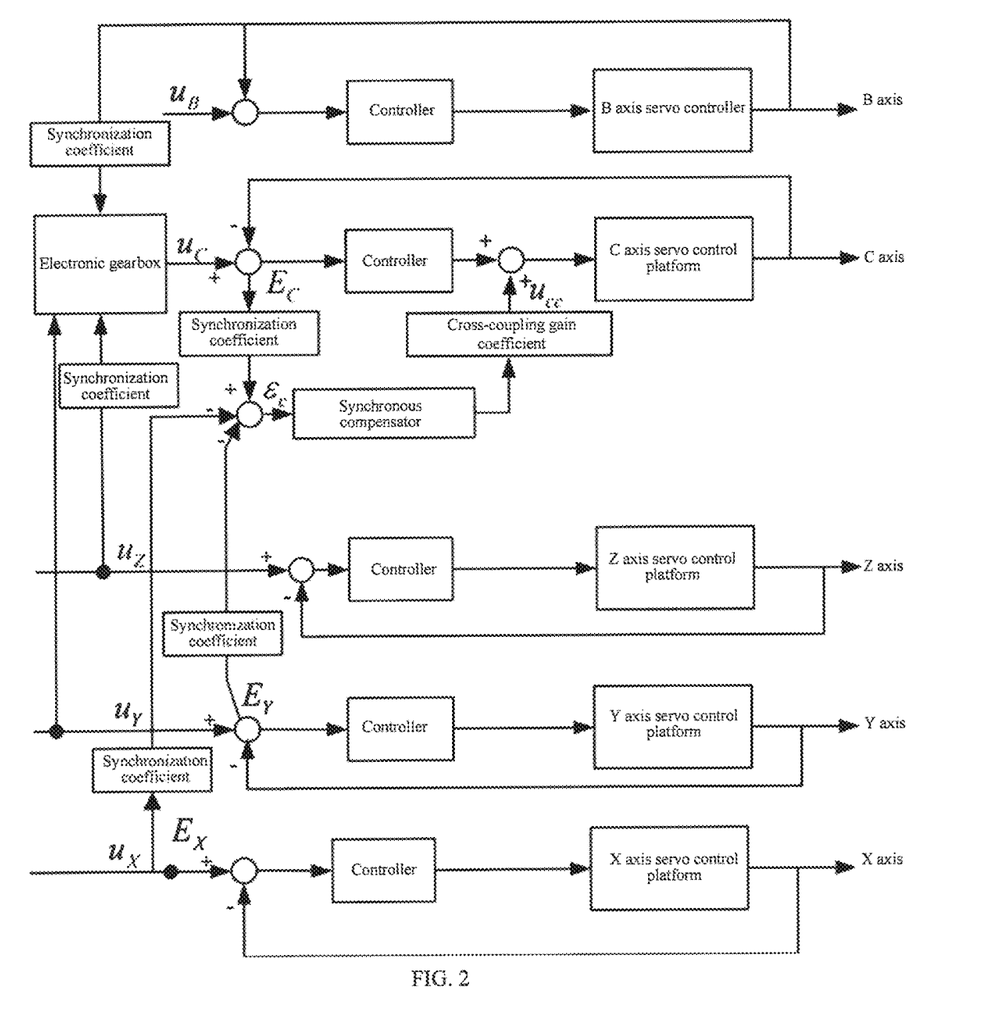
FIG. 2 is a schematic diagram of synchronized multi-axis motion control of a flexible electronic gearbox.

According to the machining error mathematical model, a decoupling compensation model based on the principle of cross-coupling control is proposed, as shown in FIG. 2, to reduce the synchronized multi-axis motion error so as to realize accurate control of synchronized multi-axis motion; an item $E_c^k$ in formula (3) is set to $E_c^k - \Delta E_c^{k+1}$ to obtain formula (5), and a tooth pitch error $F_P^k$ is set to 0;

$$F_P^k = 0.4718 \times (E_c^k - \Delta E_c^{k+1}) + 0.3640 \times E_x^k + 0.9200 \times \cos E_a^k E_y^k = 0 \quad (5)$$

according to formula (5), a relationship between a compensation object and multiple parameters affecting the geometric error of the gear is obtained, namely a relationship between the C axis compensation quantity $\Delta E_c^{k+1}$ at the position control time point $t_{k+1}$ and the tracking error $E_c$, $E_x$ and $E_y$ of each motion axis at the position control time point $t_k$, is obtained, and the decoupling compensation model is obtained as follows:

$$\Delta E_c^{k+1} = E_c^k + 0.7714 \times E_x^k + 1.9500 \times \cos E_a^k E_y^k \quad (6)$$

in formula (6): $E_c^{(k+1)'}$ is a C axis compensation quantity with a unit of mm.

$$E_c^{(k+1)'} = E_c^{k+1} - \Delta E_c^{k+1} \quad (7)$$

In formula (7): $E_c^{(k+1)'}$ is the C axis tracking error when synchronous motion control is adopted at the position control time point $t_{k+1}$, and the unit is rad.

(4): Calculate the Average Absolute Value and the Total Compensation Quantity of the Machining Errors.

Under the condition of not adopting the synchronous control method, average absolute values of three items of the machining errors of the total position control time t are respectively as follows:

$$M_\alpha = 0.1 \times \sum_{k=1}^{10} |F_\alpha^k| = 0.001327;$$

$$M_P = 0.1 \times \sum_{k=1}^{10} |F_P^k| = 0.001413;$$

$$M_\beta = 0.1 \times \sum_{k=1}^{10} |F_\beta^k| = 0.001470$$

$M_\alpha$ is an average absolute value of tooth profile errors with a unit of mm, $M_P$ is an average absolute value of tooth pitch errors with a unit of mm, $M_\beta$ is an average absolute value of tooth shape errors with a unit of mm, and k is 0-10.

Under the condition of adopting the synchronous control method, $E_b^k$, $E_c^{k'}$, $E_z^k$, $E_y^k$, $E_x^k$ and $E_a^k$ are taken into formulas (2), (3) and (4) to obtain $F_\alpha^{k'}$, $F_P^{k'}$ and $F_\beta^{k'}$ of the position control time point $t_k$, and average absolute values of three items of the machining errors of the total position control time t are respectively as follows:

$$M'_\alpha = 0.1 \times \sum_{k=1}^{10} |F_\alpha^{k'}| = 0.001190;$$

$$M'_P = 0.1 \times \sum_{k=1}^{10} |F_P^{k'}| = 0.001266;$$

$$M'_\beta = 0.1 \times \sum_{k=1}^{10} |F_\beta^{k'}| = 0.001300$$

$M_\alpha'$ is an average absolute value of tooth profile errors with a unit of mm, $M_P'$ is an average absolute value of tooth pitch errors with a unit of mm, $M_\beta'$ is an average absolute value of tooth shape errors with a unit of mm, and k is 0-10.

The total compensation quantity for the total position control time t is:

$$S = 10 \times (M_\alpha + M_P + M_\alpha - M_\alpha' - M_P' - M_\beta') = 0.004542 \quad (8)$$

in formula (8), S is the total compensation quantity for the total position control time t with a unit of mm, and the synchronized multi-axis motion control of the total position control time t is completed.

The effect of synchronized multi-axis motion control is shown in Table 2.

TABLE 2

| | $F_\alpha^k$ | $F_P^k$ | $F_\beta^k$ | $F_\alpha^{k'}$ | $F_P^{k'}$ | $F_\beta^{k'}$ |
|---|---|---|---|---|---|---|
| $t_1$ | 0.001865 | 0.001985 | 0.002307 | 0.001041 | 0.001108 | 0.00143 |
| $t_2$ | −0.00071 | −0.00075 | −0.00064 | −0.00257 | −0.00274 | −0.00262 |
| $t_3$ | −0.00106 | −0.00113 | −0.00105 | −0.00035 | −0.00037 | −0.0003 |
| $t_4$ | 0.001382 | 0.001471 | 0.001719 | 0.002441 | 0.002598 | 0.002845 |
| $t_5$ | 0.00093 | 0.00099 | 0.001047 | −0.00045 | −0.00048 | −0.00042 |
| $t_6$ | 0.000797 | 0.000848 | 0.000907 | −0.00013 | −0.00014 | −0.00008 |
| $t_7$ | 0.00133 | 0.001415 | 0.001592 | 0.000533 | 0.000567 | 0.000744 |
| $t_8$ | 0.00151 | 0.001607 | 0.001761 | 0.000181 | 0.000192 | 0.000346 |
| $t_9$ | −0.00101 | −0.00108 | −0.00102 | −0.00252 | −0.00268 | −0.00263 |
| $t_{10}$ | −0.00268 | −0.00285 | −0.00265 | −0.00167 | −0.00178 | −0.00158 |

Due to abrupt changes in motion error values of each axis, at a few position control time points, the values $F_\alpha^{k'}$, $F_P^{k'}$ and $F_\beta^{k'}$ and a after compensation by synchronous motion control are greater than the values $F_\alpha^k$, $F_P^k$ and $F_\beta^k$ without compensation by synchronous motion control, such as position control time points $t_2$, $t_4$ and $t_9$ in Table 2. However, this does not affect the effectiveness of synchronous motion control for the total position control time.

It can be seen that under the condition of adopting the synchronous control method, average absolute values of three items of the machining error are smaller than the average absolute values of the corresponding items without the adoption of the synchronous control method. The total compensation quantity of the machining error was 0.004542 mm within the total position control duration of 11 mm.

Example 2

Hob parameters are as follows: with respect to a left-handed hob, a normal module to $m_n$ is 2, the number $Z_b$ of hob heads is 1, a hob pressure angle α is 20°, a hob spiral angle γ is 2.01°, an installation angle γ is 22.99°, hob axial feed $V_Z$ is greater than 0, and hob tangential feed $V_Y$ is less than 0. Workpiece parameters are as follows: a gear normal module $m_n$ is 2, the number $Z_c$ of gear teeth is 27, a gear pressure angle α is 20°, the gear is left-handed, a spiral angle β is −25°, and the total position control time is 11 ms and is divided into 11 position control time points.

The method for synchronized multi-axis motion control based on a flexible electronic gearbox includes the following operating steps:

(1): Determine the gear machining type by "a diagonal hobbing method".

When the "diagonal hobbing method" is used to machine a helical cylindrical gear, since a hob cutter moves along the Z axis, the C axis generates additional rotation to meet a geometrical relationship of a generated spiral; when them is a need for a hob shifting process, since the hob cutter moves along the Y axis, the C axis generates additional rotation to meet a generating relationship changing due to hob shifting; the generating and differential relationship for machining the helical cylindrical gear is shown in formula (1), $$n_c = -0.0370 \times n_b + 0.0025 \times v_z - 0.0058 \times v_y \quad (1).$$

In the formula, $n_b$ is a hob shaft speed, $n_c$ is a rotating speed of a workpiece, $v_z$ is a hob axial feed speed, and $v_y$ is a hob tangential feed speed.

(2): Establish a machining error mathematical model.

After the machining types of the CNC gear hobbing machine determined by step (1) are a right-handed helical cylindrical gear, a machining error mathematical model of a workpiece at a position control time point $t_k$ is established, relevant parameters involved in the motion errors include: a B axis tracking error $E_b$, a C axis tracking error $E_c$, a Z axis tracking error $E_z$, a Y axis tracking error $E_y$, an X axis tracking error $E_x$ and a hob installation angle error $E_a$; tracking errors of each motion axis at the position control time point $t_k$ are recorded as $E_b^k$, $E_c^k$, $E_z^k$, $E_y^k$, $E_x^k$ and $E_d^k$, where k is 0-10; and tracking error data of each motion axis for the position control time points $t_0$ to $t_{10}$ is shown in Table 3.

TABLE 3

| | $E_a^k$ | $E_c^k$ | $E_z^k$ | $E_y^k$ | $E_x^k$ |
|---|---|---|---|---|---|
| $t_0$ | 0 | 0.0013 | 0.00021 | −0.00019 | −0.00017 |
| $t_1$ | 0.0001 | 0.0022 | 0.00009 | −0.00037 | 0.00024 |

TABLE 3-continued

| | $E_a^k$ | $E_c^k$ | $E_z^k$ | $E_y^k$ | $E_x^k$ |
|---|---|---|---|---|---|
| $t_2$ | 0 | 0.0052 | 0.00017 | −0.00021 | −0.00009 |
| $t_3$ | 0.0001 | 0.0041 | 0.00014 | −0.00034 | −0.00021 |
| $t_4$ | −0.0002 | 0.0027 | 0.00018 | 0.00013 | −0.00012 |
| $t_5$ | 0.0001 | −0.0019 | 0.00021 | −0.00034 | 0.00035 |
| $t_6$ | 0 | −0.0037 | 0.00034 | 0.00028 | 0.00003 |
| $t_7$ | 0 | −0.0018 | 0.00012 | −0.00053 | −0.00029 |
| $t_8$ | 0 | 0.0011 | 0.00004 | −0.00038 | 0.00025 |
| $t_9$ | 0.0001 | 0.0027 | 0.00022 | −0.00043 | 0.00021 |
| $t_{10}$ | −0.0002 | 0.0013 | 0.00029 | 0.00021 | −0.00019 |

Three evaluation indexes of the geometric error of the gear, namely tooth profile deviation $F_\alpha^k$, tooth pitch deviation $F_P^k$ and tooth direction deviation $F_\beta^k$, are established according to a relative position and attitude relationship between the hob and the workpiece during hobbing, and the machining error mathematical model of the position control time point $t_k$ is as follows:

$$F_\alpha^k = 0.4886 \times E_c^k + 0.3420 \times E_x^k + 0.8651 \times \cos E_a^k E_y^k \quad (2)$$

$$F_P^k = 0.5200 \times E_c^k + 0.3640 \times E_x^k + 0.9206 \cos E_a^k E_y^k \quad (3)$$

$$F_\beta^k = 0.5200 \times E_c^k + 0.9206 \times \cos E_a^k E_y^k - 0.4663 \times E_z^k \quad (4)$$

In formulas (2), (3) and (4), units of $F_\alpha^k$, $F_P^k$ and $F_\beta^k$ are mm, units of $E_z^k$, $E_y^k$ and $E_x^k$ are mm, units of and $E_b^k$ are $E_c^k$ are rad, and the unit of $E_a^k$ is degree.

(3): Establish a decoupling compensation model.

According to the machining error mathematical model, a decoupling compensation model based on the principle of cross-coupling control is proposed, as shown in FIG. 2, to reduce the synchronized multi-axis motion error so as to realize accurate control of synchronized multi-axis motion; an item $E_c^k$ in formula (3) is set to $E_c^k - \Delta c^{k+1}$ to obtain formula (5), and a tooth pitch error $F_P^k$ is set to 0;

$$F_P^k = 0.5200 \times (E_c^k - \Delta E_c^{k+1}) + 0.3640 \times E_x^k + 0.9206 \times \cos E_a^k E_y^k = 0 \quad (5)$$

according to formula (5), a relationship between a compensation object and multiple parameters affecting the geometric error of the gear is obtained, namely a relationship between the C axis compensation quantity $\Delta E_c^{k+1}$ at the position control time point $t_{k+1}$ and the tracking error $E_c$, $E_x$ and $E_y$ of each motion axis at the position control time point $t_k$, is obtained, and the decoupling compensation model is obtained as follows:

$$\Delta E_c^{k+1} = E_c^k + 0.7000 \times E_x^k + 1.7705 \times \cos E_a^k E_y^k \quad (6)$$

in formula (6): $\Delta E_c^{k+1}$ is a C axis compensation quantity with a unit of mm.

$$E_c^{(k+1)'} = E_c^{k+1} - \Delta E_c^{k+1} \quad (7)$$

in formula (7): $E_z^{(k+2)'}$ is the C axis tracking error when synchronous motion control is adopted at the position control time point $t_{k+1}$, and the unit is rad;

(4): Calculate the average absolute value and the total compensation quantity of the machining errors.

Under the condition of not adopting the synchronous control method, average absolute values of three items of the machining errors of the total position control time t are respectively as follows:

$$M_\alpha = 0.1 \times \sum_{k=1}^{10} |F_G^k| = 0.001235;$$

-continued $$M_P = 0.1 \times \sum_{k=1}^{10} |F_p^k| = 0.001315;$$

$$M_\beta = 0.1 \times \sum_{k=1}^{10} |F_\beta^k| = 0.001293$$

$M_\alpha$ is an average absolute value of tooth profile errors with a unit of mm, $M_P$ is n average absolute value of tooth pitch errors with a unit of mm, $M_\beta$ is an average absolute value of tooth shape errors with a unit of mm, and k is 0-10.

Under the condition of adopting the synchronous control method, $E_b^k$, $E_c^{k'}$, $E_z^k$, $E_y^k$, $E_x^k$ and $E_d^k$ are taken into formulas (2), (3) and (4) to obtain $F_\alpha^{k'}$, $F_P^{k'}$ and $F_\beta^{k'}$ of the position control time point $t_k$, and average absolute values of three items of the machining errors of the total position control time t are respectively as follows:

$$M'_\alpha = 0.1 \times \sum_{k=1}^{10} |F_\alpha^{k'}| = 0.000864;$$

$$M'_P = 0.1 \times \sum_{k=1}^{10} |F_p^{k'}| = 0.000920;$$

$$M'_\beta = 0.1 \times \sum_{k=1}^{10} |F_\beta^{k'}| = 0.000927$$

$M_\alpha'$ is an average absolute value of tooth profile errors with a unit of mm, $M_P'$ is an average absolute value of tooth pitch errors with a unit of mm, $M_\beta'$ is an average absolute value of tooth shape errors with a unit of mm, and k is 0-10.

The total compensation quantity for the total position control time t is:

$$S=10\times(M_\alpha+M_P+M_\beta-M_\alpha'-M_P'-M_\beta')=0.011325 \quad (8)$$

in formula (8), S is the total compensation quantity for the total position control time t with a unit of mm, and the synchronized multi-axis motion control of the total position control time t is completed.

The effect of synchronized multi-axis motion control is shown in Table 4.

TABLE 4

|  | $F_\alpha^k$ | $F_P^k$ | $F_\beta^k$ | $F_\alpha^{k'}$ | $F_P^{k'}$ | $F_\beta^{k'}$ |
| --- | --- | --- | --- | --- | --- | --- |
| $t_1$ | 0.000837 | 0.000891 | 0.000761 | 0.000424 | 0.000451 | 0.000322 |
| $t_2$ | 0.002328 | 0.002478 | 0.002431 | 0.001491 | 0.001587 | 0.001541 |
| $t_3$ | 0.001637 | 0.001742 | 0.001754 | −0.00069 | −0.00074 | −0.00072 |
| $t_4$ | 0.001391 | 0.00148 | 0.00144 | −0.00025 | −0.00026 | −0.0003 |
| $t_5$ | −0.0011 | −0.00117 | −0.0014 | −0.00249 | −0.00265 | −0.00288 |
| $t_6$ | −0.00156 | −0.00166 | −0.00182 | −0.00045 | −0.00048 | −0.00065 |
| $t_7$ | −0.00144 | −0.00153 | −0.00148 | 0.00018 | 0.000126 | 0.000175 |
| $t_8$ | 0.000294 | 0.000313 | 0.000203 | 0.001731 | 0.001842 | 0.001733 |
| $t_9$ | 0.001019 | 0.001084 | 0.000905 | 0.000725 | 0.000771 | 0.000592 |
| $t_{10}$ | 0.000752 | 0.0008 | 0.000734 | −0.00027 | −0.00028 | −0.00035 |

Due to abrupt changes in motion error values of each axis, at a few position control time points, the values $F_\alpha^{k'}$, $F_P^{k'}$ and $F_\beta^{k'}$ after compensation by synchronous motion control are greater than the values $F_\alpha^k$, $F_P^k$ and $F_\beta^k$ without compensation by synchronous motion control, such as position control time points, $t_5$ and $t_8$ in Table 4. However, this does not affect the effectiveness of synchronous motion control for the total position control time.

It can be seen that under the condition of adopting the synchronous control method, average absolute values of three items of the machining error are smaller than the average absolute values of the corresponding items without the adoption of the synchronous control method. The total compensation quantity of the machining error was 0.011325 mm within the total position control duration of 11 mm.

What is claimed is:

1. A method for synchronized multi-axis motion control of a flexible electronic gearbox, wherein the method for synchronized multi-axis motion control is suitable for a CNC gear bobbing machine; the gear hobbing machine comprises an A axis, a B axis, a C axis, an X axis, a Y axis and a Z axis, the A axis serves as a reference for adjusting a hob installation angle, the B axis serves as a reference for hob rotation, the C axis serves as a reference for workpiece rotation, the X axis serves as a reference for hob radial feeding, the Y axis serves as a reference for hob tangential feeding, the Z axis serves as a reference for hob axial feeding, wherein the B axis, the X axis, the Y axis and the Z axis are main motion axes; a servo motor of each main motion axis is detected by a grating encoder and detection results are then input into a microprocessor as reference data, detections results of the B axis, Y axis and Z axis (excluding the X axis) obtained after a functional module of the flexible electronic gearbox performs calculation and transformation according to a mathematical model of a gear bobbing machining technology serve as working data of the C axis, a motion law specified by an electronic gearbox module is realized by using a control theory algorithm to realize gear bobbing machining; the flexible electronic gearbox realizes control functions based on an ARM-DSP-FPGA based hardware platform, wherein according to a machining principle of the CNC gear hobbing machine, a functional relation between a geometric error of a gear and a tracking error of each motion axis of the machine tool is constructed; the tracking errors comprise: a B axis tracking error $E_b$ (a hob rotation axis tracking error $E_b$), a C axis tracking error $E_c$ (a workpiece rotation axis tracking error $E_c$), a Z axis tracking error $E_z$ (a hob axial feed axis tracking error $E_z$), a Y axis tracking error $E_y$ (a hob tangential feed axis tracking error $E_y$), an X axis tracking error $E_x$ (a hob radial feed axis tracking error $E_x$) and a hob installation angle error $E_a$; a machining error mathematical model of tooth profile deviation $F_\alpha$, tooth pitch deviation $F_P$ and spiral deviation $F_\beta$ is established by tracking errors of each motion axis, and the geometric error of the gear is evaluated by using numerical results of the machining error mathematical model; through each motion axis error of each position control time point, machining error values of this time point, namely the value of the tooth profile deviation $F_\alpha$, the value of the tooth pitch deviation $F_P$ and the value of the spiral deviation $F_\beta$, are calculated; based on a principle of cross-coupling control, a decoupling compensation model is established to calculate a compensation quantity $\Delta E_c$ required for the C axis; the compensation quantity $\Delta E_c$ is compensated to the C axis at the next position control time point, and the compensated machining error values, namely the compensated value of the tooth profile deviation $F_\alpha$, the compensated value of the tooth pitch deviation $F_P$ and the compensated value of the spiral deviation $F_\beta$, are calculated through tracking errors of each motion axis at the time point; meanwhile, the synchronized multi-axis motion control of the total position control time is completed by obtaining average absolute values of the machining errors and the total compensation quantity of the machining errors under the conditions of not adopting the synchronous control method and adopting the synchronous control method in the total position control time.

2. The method for synchronized multi-axis motion control of a flexible electronic gearbox according to claim 1, comprising the following operating steps:

(1): determining the gear machining type by "a diagonal hobbing method"

wherein when the "diagonal hobbing method" is used to machine a helical cylindrical gear, since a hob cutter moves along the Z axis, the C axis generates additional rotation to meet a geometrical relationship of a generated spiral; when there is a need for a hob shifting process, since the hob cutter moves along the Y axis, the C axis generates additional rotation to meet a generating relationship changing due to hob shifting;

the generating and differential relationship for machining the helical cylindrical gear is shown in formula (1), $$n_c = K_b \frac{Z_b}{Z_c} n_b + K_z \frac{\sin\beta}{\pi m_n Z_c} v_z + K_y \frac{\cos\lambda}{\pi m_n Z_c} v_y \tag{1}$$

in formula (1): $Z_b$, $\lambda$ and $n_b$ are the number of threads of a hob cutter, a hob spiral angle and a hob shaft speed respectively, $Z_c$, $\beta$, $m_n$, and $n_c$ are the number of workpiece teeth, a spiral angle of a workpiece, a normal module of the workpiece and a rotating speed of the workpiece respectively; $K_b$, $K_z$ and $K_y$ are a first item coefficient, a second item coefficient and a third item coefficient respectively; $v_z$ is a hob axial feed speed, and $v_y$ is a hob tangential feed speed; when the hob spiral angle is right-handed, namely when $\beta>0$, $K_B=1$; when the hob spiral angle is left-handed, namely when $\beta<0$, $K_B=-1$; when $\beta>0$ and $V_Z<0$, $K_Z=1$; when $\beta<0$ and $V_Z<0$, $K_Z=-1$; when $\beta>0$ and $V_Z>0$, $K_Z=-1$; when $\beta<0$ and $V_Z>0$, $K_Z=1$; when $V_Y>0$, $K_Y=1$; when $V_Y<0$, $K_Y=-1$;

when a straight tooth cylindrical gear is machined, the spiral angle of the workpiece $\beta=0$;

(2): establishing a machining error mathematical model wherein the machining types of the CNC gear hobbing machine determined by step (1) are a left-handed helical cylindrical gear, a right-handed helical cylindrical gear and the straight tooth cylindrical gear; a machining error mathematical model of a workpiece at a position control time point $t_k$ is established, relevant parameters involved in the motion errors comprise: a B axis tracking error $E_b$, a C axis tracking error $E_c$, a Z axis tracking error $E_z$; a Y axis tracking error $E_y$, an X axis tracking error $E_x$ and a hob installation angle error $E_a$; tracking errors of each motion axis at the position control time point $t_k$ are recorded as $E_b^k$, $E_c^k$, $E_z^k$, $E_y^k$, $E_x^k$ and $E_a^k$, wherein units of $E_z^k$, $E_y^k$ and $E_x^k$ are mm, units of $E_b^k$ and $E_c^k$ are rad, and the unit of $E_a^k$ is degree, k is 0-n;

three evaluation indexes of the geometric error of the gear, namely tooth profile deviation $F_\alpha^k$, tooth pitch deviation $F_P^k$ and tooth direction deviation $F_\beta^k$, are established according to a relative position and attitude relationship between the hob and the workpiece during bobbing, and the machining error mathematical model of the position control time point $t_k$ is as follows:

$$F_\alpha^k = \frac{\pi m_n Z_c \cos\alpha}{360°\cos\beta} E_c^k + \sin\alpha E_x^k + \cos\gamma\cos E_a^k \cos\alpha E_y^k \tag{2}$$

$$F_P^k = \frac{\pi m_n Z_c}{360°\cos\beta} E_c^k + \tan\alpha E_x^k + \cos\gamma\cos E_a^k E_y^k \tag{3}$$

$$F_\beta^k = \frac{\pi m_n Z_c}{360°\cos\beta} E_c^k + \cos\gamma\cos E_a^k E_y^k + \tan\beta E_z^k \tag{4}$$

in formulas (2), (3) and (4), units of $F_\alpha^k$, $F_P^k$ and $F_\beta^k$ are mm, $m_a$ is a normal module of the workpiece, $Z_c$ is the number of workpiece teeth, $\alpha$ is a workpiece pressure with a unit of degree, $\beta$ is a spiral angle of the workpiece with a unit of degree, $\gamma$ is a hob installation angle with a unit of degree; when the hob is right-handed, $\beta$ is greater than 0; when the hob is left-handed, $\beta$ is less than 0;

(3): establishing a decoupling compensation model wherein according to the machining error mathematical model, a decoupling compensation model based on the principle of cross-coupling control is proposed to reduce the synchronized multi-axis motion error so as to realize accurate control of synchronized multi-axis motion; an item $E_c^k$ in formula (3) is set to $E_c^k - \Delta E_c^{k+1}$ to obtain formula (5), and a tooth pitch error $F_P^k$ is set to 0;

$$F_P^k = \frac{\pi m_n Z_c}{360°\cos\beta}(E_c^k - \Delta E_c^{k+1}) + \tan\alpha E_x^k + \cos\gamma\cos E_a^k E_y^k = 0 \tag{5}$$

according to formula (5), a relationship between a compensation object and multiple parameters affecting the geometric error of the gear is obtained, namely a relationship between the C axis compensation quantity $\Delta E_c^{k+1}$ at the position control time point $t_{k+1}$ and the tracking error $E_c$, $E_x$ and $E_y$ of each motion axis at the position control time point $t_k$, is obtained, and the decoupling compensation model is obtained as follows:

$$\Delta E_c^{k+1} = E_c^k + \frac{360°\tan\alpha\cos\beta}{\pi m_n Z_c} E_x^k + \frac{360°\cos\gamma\cos E_n^k \cos\beta}{\pi m_n Z_c} E_y^k \tag{6}$$

in formula (6): $\Delta E_c^{k+1}$ is a C axis compensation quantity with a unit of mm, $m_n$ is gear normal module, $Z_c$ is the number of gear teeth, $\alpha$ is a gear pressure angle with a unit of degree, $\beta$ is a spiral angle of a gear with a unit of degree, and $\gamma$ is a hob installation angle with a unit of degree;

$$E_c^{(k+1)'} = E_c^{k+1} - \Delta E_c^{k+1} \tag{7}$$

in formula (7): $E_c^{(k+1)'}$ is the C axis tracking error when synchronous motion control is adopted at the position control time point $t_{k+1}$, and the unit is rad;

in formulas (5), (6) and (7), k is 0-n;

(4): calculating the average absolute value of the machining errors and the total compensation quantity of the machining errors wherein under the condition of not adopting the synchronous control method, average absolute values of three items of the machining errors of the total position control time t are respectively as follows:

$$M_\alpha = \frac{1}{n}\sum_{k=1}^{n}|F_\alpha^k|; \ M_P = \frac{1}{n}\sum_{k=1}^{n}|F_P^k|; \ M_\beta = \frac{1}{n}\sum_{k=1}^{n}|F_\beta^k|$$

$M_\alpha$ is an average absolute value of tooth profile errors with a unit of mm, $M_P$ an average absolute value of tooth pitch errors with a unit of mm, $M_\beta$ is an average absolute value of tooth shape errors with a unit of mm, and k is 0-n;

under the condition of adopting the synchronous control method, $E_b^k$, $E_c^{k'}$, $E_z^k$, $E_y^k$, $E_x^k$ and $E_a^k$ are taken into formulas (2), (3) and (4) to obtain $F_\alpha^{k'}$, $F_P^{k'}$ and $F_\beta^{k'}$ of the position control time point $t_k$, and average absolute values of three items of the machining errors of the total position control time t are respectively as follows:

$$M'_\alpha = \frac{1}{n}\sum_{k=1}^{n}|F_\alpha^{k'}|; \ M'_P = \frac{1}{n}\sum_{k=1}^{n}|F_P^{k'}|; \ M'_\beta = \frac{1}{n}\sum_{k=1}^{n}|F_\beta^{k'}|$$

$M_\alpha'$ is an average absolute value of tooth profile errors with a unit of mm, $M_P'$ is an average absolute value of tooth pitch errors with a unit of mm, $M_\beta'$ is an average absolute value of tooth shape errors with a unit of mm, and k is 0-n;

the total compensation quantity for the total position control time t is:

$$S = n(M_\alpha + M_P + M_\beta - M_\alpha' - M_P' - M_\beta') \tag{8}$$

in formula (8), S is the total compensation quantity for the total position control time t with a unit of mm, and the synchronized multi-axis motion control of the total position control time t is completed.

* * * * *